July 26, 1960
J. SAPERSTEIN
2,946,366
TIRE TRACTION ATTACHMENT
Filed July 15, 1958
2 Sheets-Sheet 1
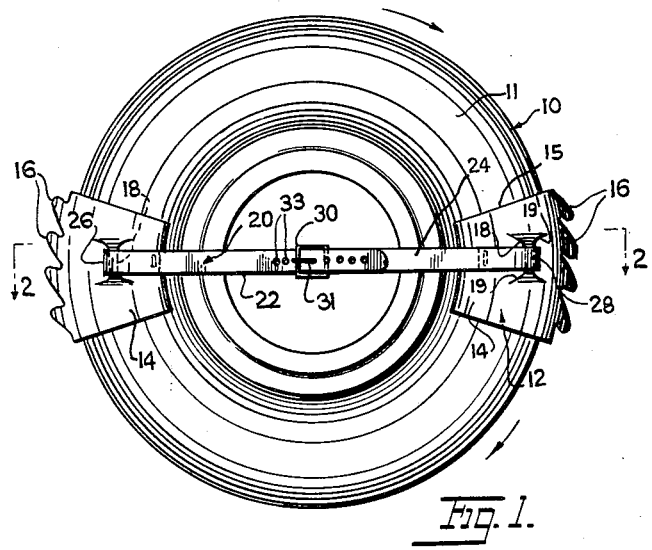
Fig. 1.
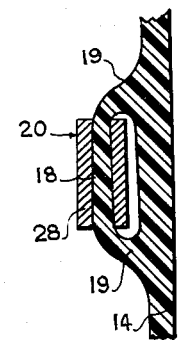
Fig. 4.
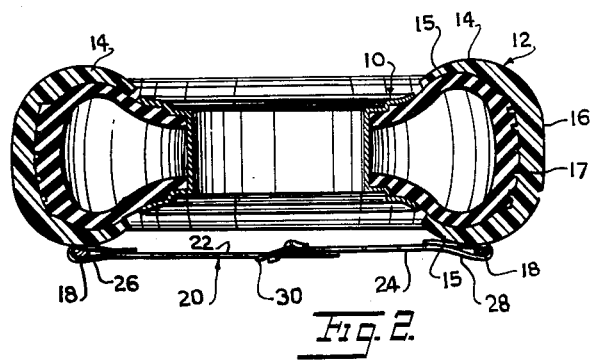
Fig. 2.
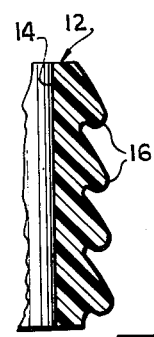
Fig. 5.
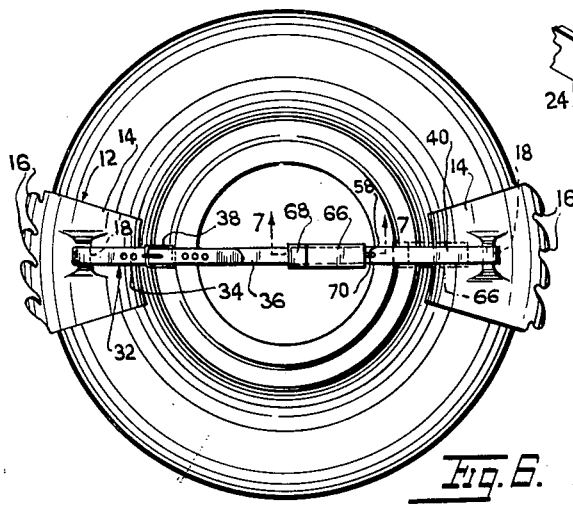
Fig. 6.
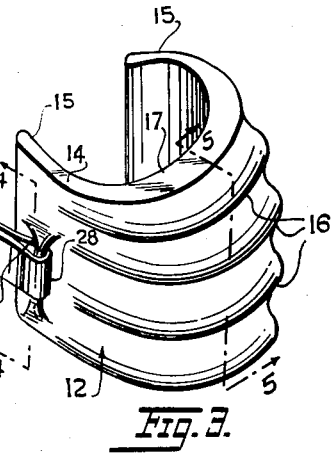
Fig. 3.
INVENTOR.
JOEL SAPERSTEIN
BY
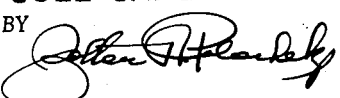
ATTORNEY July 26, 1960   J. SAPERSTEIN   2,946,366
TIRE TRACTION ATTACHMENT
Filed July 15, 1958   2 Sheets-Sheet 2
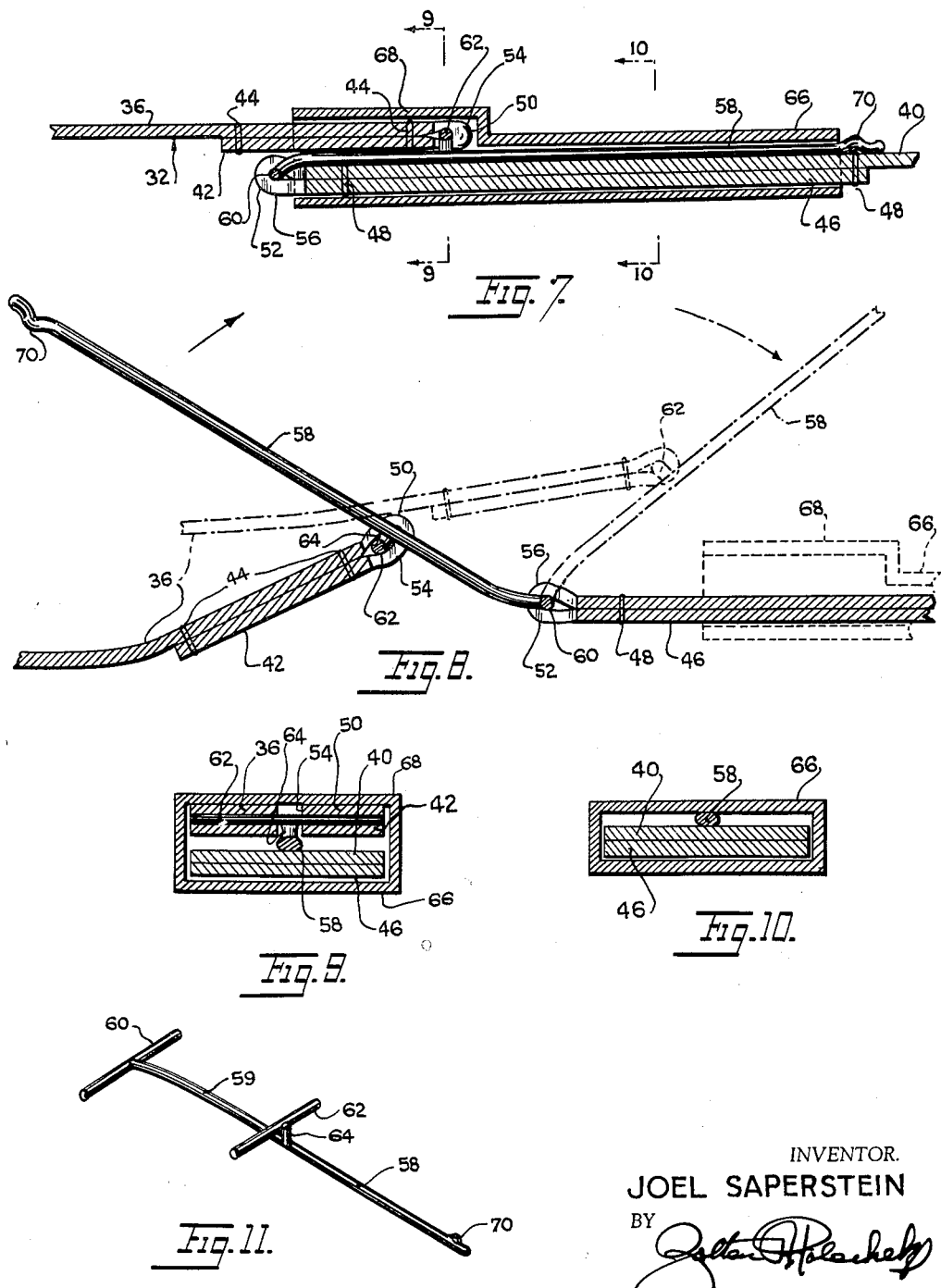
INVENTOR.
JOEL SAPERSTEIN
ATTORNEY United States Patent Office 2,946,366
Patented July 26, 1960

2,946,366

TIRE TRACTION ATTACHMENT

Joel Saperstein, 211—11B Hillside Ave., Queens Village, N.Y.

Filed July 15, 1958, Ser. No. 748,665

6 Claims. (Cl. 152—218)

This invention relates generally to attachments for pneumatically tired vehicle wheels. More particularly, the invention has reference to attachments of the clip-on type, which can be swiftly positioned in straddling relation to the tread of the vehicle tire, and which are designed when so positioned to provide a highly effective traction aid for the vehicle wheel, with an even pressure on the brake pedals regardless of the speed at which the car is traveling.

The desirability of devices of the character stated is, of course, well known and appreciated in the art to which the invention pertains. It is sufficient to note, in this connection, that one disadvantage which has previously existed in devices of this type has resided in the relative difficulty of applying, or for that matter removing, the traction attachment. In many instances, the vehicle must be jacked up to raise the wheel off the ground. Then, too, it is often necessary for the device to be secured at a number of places about the periphery of the wheel. Even so, breakage of the device tends to result in many cases, and in addition, in many instances the traction is not improved sufficiently to justify the expense and the laborious application and removal process involved.

The present invention aims to obviate the various difficulties and deficiencies which have been generally discussed above. Accordingly, in carrying out the invention there is provided a wheel attachment which includes diametrically opposed, U-shaped members that straddle the tire casing, the invention including means connected directly between said members to hold the same securely in position.

Another object is to provide, in an attachment as described, improved cleat means particularly shaped to increase traction in snowy, icy, or muddy road conditions.

A further object is to form each cleat member as a unitary, molded article to decrease the cost of manufacture thereof while still permitting the same to be self-adjusting to the particular cross-sectional shape and size of the tire on which it is mounted.

Another object is to provide, in a device of the type stated, an adjustable, flexible connection between the diametrically opposed cleat members, designed to permit swift, secure engagement of the members with the associated tire.

A further object, in a second form of the invention, is to provide an improved flexible connection, designed to permit, first, a rough or major adjustment of the length of said connection, with the connection then including means to place the same under strong tension.

A further object, in connection with the above-mentioned modified construction, is to provide an improved lock that will hold the connection-tensioning means in its proper, operative position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a vehicle wheel with a tire equipped with a traction aid device according to the present invention.

Fig. 2 is a sectional view substantially on line 2—2 of Fig. 1.

Fig. 3 is an enlarged perspective view of one of the cleat members.

Fig. 4 is an enlarged, detail sectional view showing the flexible connection, taken substantially on line 4—4 of Fig. 3.

Fig. 5 is a view transversely through the cleat member, on line 5—5 of Fig. 3, on approximately the same scale as Fig. 3.

Fig. 6 is a front elevational view of a tire equipped with a modified form of the invention.

Fig. 7 is an enlarged, detail sectional view on line 7—7 of Fig. 6, showing the tensioning means in its locked, operative position.

Fig. 8 is a view on the same cutting plane as Fig. 7, and on the same scale as Fig. 7, with the tensioning means being shown in full lines in an almost fully unlocked position, and in dotted lines in an intermediate position as it approaches a full locking position.

Fig. 9 is a transverse section on the same scale as Fig. 7, taken on line 9—9 of Fig. 7.

Fig. 10 is a transverse sectional view, on the same scale as Fig. 7, taken on line 10—10 of Fig. 7.

Fig. 11 is a perspective view, on a reduced scale, of the tensioning lever per se.

Referring to the drawings in detail, generally designated at 10 is a conventional automobile wheel, including the usual pneumatic tire 11. Generally designated at 12 is the traction aid device comprising the present invention. This device includes identical, oppositely arranged cleat members 14 each of which is of U-shape in cross section, so as to permit the same to straddle the tire casing as shown to particular advantage in Fig. 2. Each cleat member is formed from a single, molded piece of material and in a preferred embodiment, the cleat member would be formed of a plastic having a slight amount of flexibility and also possessed of a certain amount of resiliency.

By reason of this arrangement, the cleat member may be initially molded so as to tension the side walls 15 thereof toward each other, so that said side walls must be spread apart against the inherent resiliency thereof, to cause the same to move into straddling, clamping engagement with the tire casing. When the device is fully applied, the side walls are free to swing or flex toward each other once again, and as a result, move into full clamping engagement with the side walls of the tire casing.

The material of each cleat member, further, is sufficiently thick to cause the same to be possessed of considerable ruggedness and durability, and in a preferred embodiment, the cleat member would be thickest at its bight portion, with the thickness being progressively decreased in a direction toward its opposite side edges, that is, the side walls 15 of each cleat member are progressively reduced in thickness in a direction away from the bight portion 17 thereof (see Fig. 2), thereby causing a proportionate or corresponding increase in the resiliency and flexibility of each side wall, in the same direction, that is, in a direction away from the bight portion.

Each cleat member is provided with molded-on or integrally formed cleats 16. A plurality of the spaced cleats is provided upon each member, each cleat extending transversely of the bight portion 17. It may be noted that each cleat is transversely inclined, in a direction such that the crest or top edge of each cleat 16 will be leading, in the sense of direction of rotation of the tire during the ordinary forward movement of the vehicle. This may be noted readily from Fig. 1, in which the direction of rotation of the wheel during said forward movement is indicated by an arrow.

By reason of this arrangement, it has been found that there is a biting action of the transversely extending cleats 16 into the snowy or muddy surface, increasing traction to a considerable degree.

Designated at 18 on each cleat member 14 is an attaching bar, the ends of which are widened as at 19 and integrally connected to the outer surface of the adjacent side wall 15. The attaching bars 18 are adapted to provide attaching means for an elongated, flexible connector assembly 20, connecting the respective cleat members 14.

The connector assembly 20, in Figs. 1–5, comprises an elongated strap, comprised of strap sections 22, 24 having outer ends folded upon themselves as indicated at 26, 28 and stitched to provide transverse openings through which the respective bars 18 extend. The strap sections are adjustably connected at their inner ends, through the provision of a buckle 30 mounted upon the strap section 24 and having a tang 31 extendable through any of a plurality of selected openings 33 of strap section 22.

In applying the device, one simply positions the two, diametrically opposed cleat members upon the tire casing, and during the mounting of the device, said cleat members will grip the tire casing so as to be held in place. Then, the strap sections are connected and the connection is made as tight as possible. The cleat members are thus drawn toward each other, so as to be firmly engaged against the associated surfaces of the tire tread.

The device is now ready for use, and will provide a desirable traction aid when road surface conditions are poor.

In Figs. 6–11, there is shown a modified construction. This is identical in every respect to the first form, with the exception that the cleat members are connected by a different type of diametrically extending connector assembly. The connector assembly in this form of the invention has been generally designated 32, and includes a first outer strap section 34 connected to an intermediate strap section 36 through the provision of a buckle 38. Section 34 has an outer end folded upon itself and secured to provide a transverse sleeve receiving one bar 18. The buckle 38 provides a major or rough adjustment of the overall length of the connector assembly 32.

Designated at 40 is another outer strap section, and this is connected to the intermediate strap section 36 in a manner shown to particular advantage in Figs. 7–10. As will be noted, section 36 has a folded end 42, with stitching 44 extending through the superposed portions of the section 36. Similarly, section 40 has a folded end 46, with stitching 48 extending therethrough. The folded end 46 is of substantial length in a preferred embodiment, as best shown in Fig. 7.

This provides transverse sleeves 50, 52 on the extremities of the folded ends of the sections 36, 40.

As best shown in Figs. 7 and 9 sleeves 50, 52, medially between their ends, are provided with slits 54, 56, respectively. Designated at 58 is an elongated lever or operating rod shown per se in Fig. 11. This has a substantially straight elongated body portion 59, and integral or otherwise made rigid with one end of the body portion 59 is an end crossbar 60. An intermediate crossbar 62 is fixedly connected by a short connecting portion 64 to the intermediate part of the body portion 59.

Crossbars 60, 62 are permanently engaged in sleeves 52, 50, respectively.

Designated at 66 is an elongated locking sleeve or keeper. This is in the form of a tubular member formed open at its opposite ends, the top wall of said member being upwardly offset at one end as at 68. The member 66 is of rectangular cross section when used at any location along its length, as will be readily seen from Figs. 9 and 10.

The locking sleeve 66 is freely slidable along the section 40, as for example between the dotted line and full line positions shown in Fig. 6.

In use of this form of the invention, one would apply the cleat members 14, with the lever 58 in the full line position shown in Fig. 8. Previously, sections 34, 36 would be connected by means of the buckle, to provide a major adjustment. Once the sections are connected to the buckle, they may be left connected, if desired. In any event, with the cleat members applied to diametrically opposite portions of the wheel tire, one swings the lever 58 from the full line position in the direction of the arrows shown in Fig. 8, through the dotted line position shown in the same figure of the drawing. The lever is moved fully to the Fig. 7 position thereof, in which it is in face-to-face contact with the strap section 40.

When the lever swings in this manner, it pivots within the sleeve 52, and pulls the section 36 to the right in Fig. 8, into overlying, face-to-face contact with the section 40 as shown in Fig. 7. This overlaps the sections, and reduces the overall length of the connector assembly, so as to tension the same and cause the cleat members to be securely engaged against the tire.

Now, to lock the parts against movement out of their Fig. 7 position, one simply slides the locking sleeve 66 from the dotted line position shown in Fig. 6, to the full line position shown in the same figure of the drawing. The locking sleeve has the larger offset end 68 adapted to receive the overlapping portions of the sections 36, 40. The remainder of the locking sleeve receives only the section 40 and the locking bar or lever 48.

When the sleeve 66 is manually moved in one direction to its full locking position as shown in Fig. 7, it moves over a small locking lug 70 provided upon the distal end of the lever 58. The parts are now in full locking position. Lug 70 however prevents sleeve 66 from accidentally moving in the opposite direction, while, of course, the section 36 is disposed as an abutment, preventing longitudinal shifting of the locking sleeve 66 to the left in Fig. 7 beyond its operative, locking position.

At such time as it is desired to remove the cleat members from the tire, one merely shifts the locking sleeve 66 back to its dotted line position of Fig. 6, thus freeing the locking bar 58 for movement to its unlocking position, to create slack in the connector assembly 32 sufficient to permit removal of the cleat members from the tire casing.

In both forms of the invention, of course, there is the common characteristic wherein the device can be made at a relatively low cost, considering the benefits to be obtained from the use thereof. Quite importantly, of course, the cleat members have the very desirable characteristic wherein they can be swiftly applied to or removed from a tire, without requiring special tools, and without jacking up of the vehicle.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A traction attachment for a vehicle wheel tire casing comprising a pair of cleat members adapted to engage diametrically opposed areas of a tire casing, and a flexible connector assembly of adjustable length extending between the cleat members, said connector assembly including a pair of outer strap sections connected to the respective cleat members, and an intermediate strap section having a detachable connection at one end to one outer strap section and having an adjustable connection at its other end to the other outer strap section, said detachable connection comprising a buckle, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position.

2. A traction attachment for a vehicle wheel tire casing comprising a pair of cleat members adapted to engage diametrically opposed areas of a tire casing, and a flexible connector assembly of adjustable length extending between the cleat members, said connector assembly including a pair of outer strap sections connected to the respective cleat members, and an intermediate strap section having a detachable connection at one end to one outer strap section and having an adjustable connection at its other outer end to the other strap section, said detachable connection comprising a buckle, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position, said locking bar having a locking lug on its free end engaging the locking sleeve to releasably hold the locking sleeve in its operative position.

3. A traction attachment for a vehicle wheel tire casing, comprising a pair of cleat members and a flexible connector assembly of adjustable length extending between the cleat members, said connector assembly including a pair of outer strap sections connected to the respective cleat members, and an intermediate strap section having a detachable connection at one end to one outer strap section and having an adjustable connection at its other end to the other outer strap section, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position.

4. A traction attachment for a vehicle wheel tire casing, comprising a pair of cleat members and a flexible connector assembly of adjustable length extending between the cleat members, said connector assembly including a pair of outer strap sections connected to the respective cleat members, and an intermediate strap section having a detachable connection at one end to one outer strap section and having an adjustable connection at its other end to the other outer strap section, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position, said locking bar having a locking lug on its free end engaging the locking sleeve to releasably hold the locking sleeve in its operative position.

5. A connector assembly for a traction attachment, comprising a flexible assembly of adjustable length, said connector assembly including a pair of outer strap sections, and an intermediate strap section having a detachable connection at one end to one outer strap section and having an adjustable connection at its other end to the other outer strap section, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position.

6. A connector assembly for a traction attachment, comprising a flexible assembly of adjustable length, said connector assembly including a pair of outer strap sections, and an intermediate strap section having a detachable connection at one end to one outer strap section and having an adjustable connection at its other end to the other outer strap section, said adjustable connection between the intermediate strap section and said other outer strap section comprising a bar pivoted on said outer strap section, said bar having a pivotal connection intermediate its ends to the intermediate strap section, whereby on swinging of the bar about its pivotal connection to the outer strap section, it will move the intermediate strap section into overlapped relation to the bar-supporting outer strap section, said adjustable connection further including a locking sleeve slidable longitudinally of said other outer strap section and movable into overlying relation to the overlapped portions of the sections and to the locking bar to hold the locking bar in its operative, locking position, said locking bar having a locking lug on its free end engaging the locking sleeve to releasably hold the locking sleeve in its operative position.

References Cited in the file of this patent

UNITED STATES PATENTS

| 2,403,309 | Smith | July 2, 1946 |
| 2,771,929 | Alterio et al. | Nov. 27, 1956 |
| 2,808,868 | Bryan | Oct. 8, 1957 |
| 2,820,501 | Heuneman | Jan. 21, 1958 |
| 2,826,232 | Korn | Mar. 11, 1958 |

FOREIGN PATENTS

| 322,618 | Great Britain | Dec. 12, 1946 |